Nov. 22, 1966 HIKOJI NOGUCHI 3,286,903
CONTAINER FOR EGGS
Filed Feb. 9, 1965 2 Sheets-Sheet 1

INVENTOR.
HIKOJI NOGUCHI
BY
McGlew and Toren
ATTORNEYS

INVENTOR.
HIKOJI NOGUCHI

United States Patent Office 3,286,903
Patented Nov. 22, 1966

3,286,903
CONTAINER FOR EGGS
Hikoji Noguchi, 10/1,251 Oaza Narahashi, Yamato-machi, Kitatama-gun, Tokyo, Japan
Filed Feb. 9, 1965, Ser. No. 431,307
Claims priority, application Japan, June 22, 1964, 39/49,182
4 Claims. (Cl. 229—2.5)

The present invention relates to a novel plastic container for eggs.

It is commonly known that the egg is at its maximum commercial value when it is newly laid. From that time on, it is constantly undergoing changes that make it less desirable. These changes are of two types. That is, (1) there are normal physical and chemical changes, and (2) there are the changes caused by the invasion of microorganisms.

Those changes mentioned in the above (1) can not be prevented, but they can be retarded by holding the egg in a container which can freely contact with a natural or artificially conditioned environment of moisture moving air, so that the increase of an air cell of the egg, which is commercially known as shrinkage and becomes larger as the water contents evaporates, may be minimized.

Those changes mentioned in the above (2) can be prevented by keeping the egg in a container which is made of plastic being softer at least than the calcareous shell of the egg and consequently can protect the cuticle of the egg which covers the shell and fills the outer openings of pores, so that the entrance of bacteria, which would occur when the pores in the shell are opened by abrasion or the shell is cracked or broken, may be prevented as long as the egg is intact.

Those changes can further be retarded by keeping the egg in a container having a structure wherein the egg can stand making its blunt end up, so that the air cell which is formed between the two layers of membrane, usually at the blunt end of the egg, may not be loosen, and the collapse of the structure of the egg contents caused thereby may not be happen.

It is desirable that such container is provided with a structure and design which can extensively be used by a raiser, transporter, such an industrialist who preserves shell eggs by cold storage, retailer, and even by consumer, without repacking, so that shell eggs once packed by the raiser may be excused from rough handling, which often induces loosing of the air cell, breaking of the structure of egg contents, or damages of the shell, in repacking them, and acceleration of physical and bacteriological disintegration may be avoided.

Hence, it is the object of the present invention to provide a novel plastic container for eggs which can prevent or retard changes of the egg in a manner as described as above.

More specifically, an object of the present invention is to provide a novel plastic container for eggs which may enable eggs to be conveyed in safety and prevent them from being cracked or broken even in case of excessive vibrations on account of the elastic property thereof.

Another object is to provide a novel plastic container for eggs which may enable eggs to breathe in a natural or artificially conditioned environment of moisture moving air and be preserved in a fresh and brand-new state.

A further object is to provide a novel plastic container for eggs whereby eggs may be prevented from going bad by virtue of the sanitary state in which they are preserved and whereby eggs may either be deposited or removed in an easy and convenient manner.

A further object is to provide a novel container for eggs which may be conveyed or handled easily and commodiously in single units and which may be stacked in tiers in stability without the risk of becoming cracked or broken.

A further object is to provide a novel plastic egg container which may be accommodated easily to the various sizes of eggs and which may protect them against damages or fractures through the elastic property thereof.

A further object is to provide a plastic egg container which may be produced in large quantities and at a low manufacturing cost.

A further object is to provide a plastic egg container which may be heaped in layers in large numbers to conserve sufficient space unless used for accommodation purposes.

With these objects in view and other objects hereinafter set forth, the arrangement and construction of the present invention will be described in the specification and claims attached hereto.

In the drawings which illustrate an embodiment of the invention:

Figure 1:
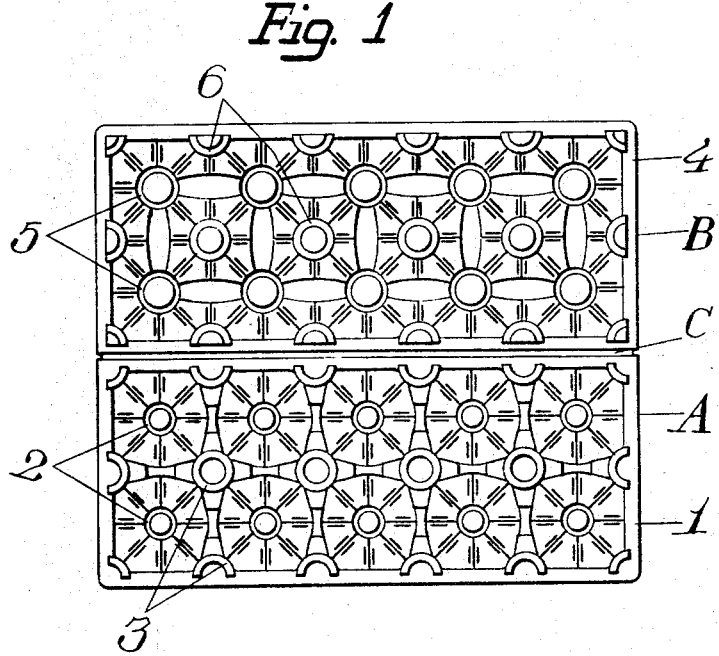
FIG. 1 is a plan view of the egg container as the cover body is unfolded from the main body thereof.
Figure 2:
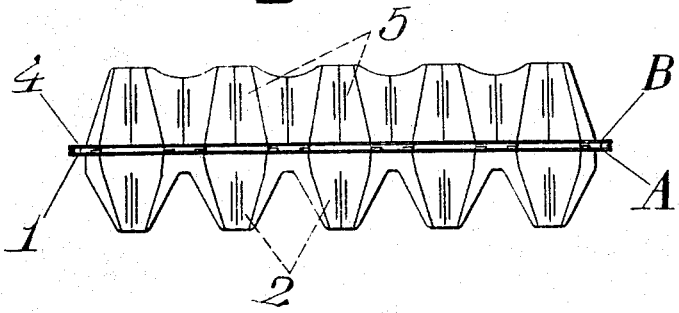
FIG. 2 is a side elevational view thereof as the cover body is folded over to the main body thereof.
Figure 3:
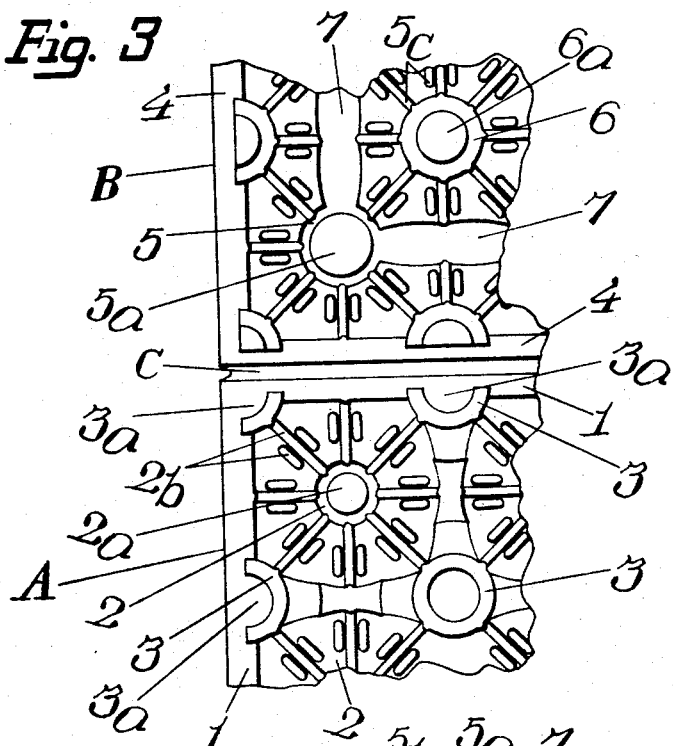
FIG. 3 is an enlarged plan view illustrating a portion of FIG. 1.
Figure 4:
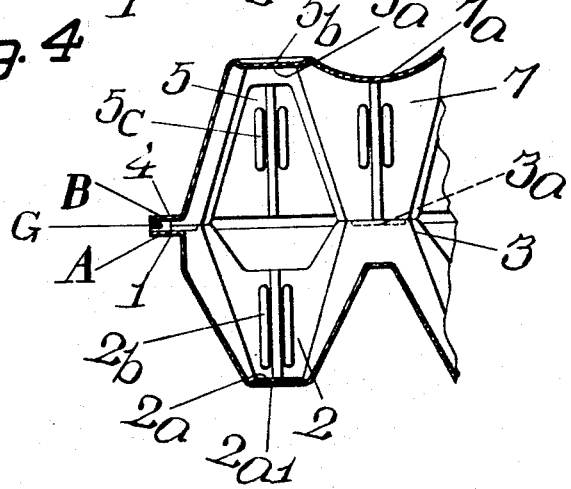
FIG. 4 is a longitudinal side elevational view illustrating a portion of FIG. 2.

Referring in detail to the drawings, A is a main body of the container, B is a cover body thereof made integral with and foldable to said main body A at the connecting part C, each having a degree of hardness which is lower at the utmost than that of the outer shells of eggs and each constructed from 0.15 to 0.18 mm. thick thermoplastic material such as vinyl chloride or the like.

Said main body A is formed with a number of hollows or cavities 2 inwardly of rim 1 and corresponding projections 3 on four sides of said cavities 2.

Said cavities 2 are acutely sloped towards the bottom so as to receive the acute end or lower half of the eggs and provided with bosses 2a at the lowermost ends thereof so as to meet the inpact given to the eggs, with said walls thinly constructed and the insides thereof formed with a plurality of alternating ribs and slots 2b. Said projectsions 3 are elevated slightly above the rim 1 and each formed with concaves 3a.

Cover body B is formed with a number of cavities 5 inwardly of rim 4 and corresponding projections 6 on four sides of said cavities 5 are each formed with convexes 6a.

Said cavities of cover body B are sloped in a somewhat gentle curve toward the bottom to receive the blunt or upper half of the egg and provided with bosses 5a at the uppermost ends thereof with the corresponding recessed portions 5b formed on the other sides of said bosses 5a or on the external surface of said cover body B, with side walls thinly constructed and the insides thereof formed with a number of alternating ribs and slots 5c. Throat 7 provide a communication between the adjoining cavities 5 and the corresponding bridges 7a are formed on the other sides of said throats 7 or on the external surface of said cover B.

In case said cover body B is folded over to said main body A each of said convexes 6a of the former snaps into the corresponding concave 3a of the latter, forming thereby a longitudinal clearance G between said rims 1 and 4 of the main body A and cover body B.

In this way, eggs may be deposited upright within each cavity with the acute ends having no air cells downwards within cavities 2 and subsequently, cover B is folded over to main body A with said rims 1 and 4 fastened to each other by a suitable clip such as a paper fastener or the like.

According to the egg container of the present invention, eggs may be deposited within thinly walled cavities 2, 5 thereof by virtue of the resilience given by the bosses 2a, 5a and by the alternating ribs and slots 2b, 5c provided to said cavities 2, 5, whereby eggs are safeguarded from damages or fractures due to the vibrations or strong impacts, and eggs of larger or smaller sizes may be safely deposited within said cavities by virtue of the elastic character thereof. Moreover, a longitudinal clearance G provides a free communication of air to each cavity, so that each egg may be preserved in a fresh and brand-new state and may either be deposited in or removed from said cavity in an easy and convenient manner. A simple clip-type fastener provides an expedient means to secure said cover body B to said main body A, so that the conveyance or handling of eggs is extremely facilitated. Further, said egg containers may be stacked one over the other with the lower portions $2a_1$ of said cavities 2a of said main body A snapped within the corresponding recessed portions 5b of said cover body B, whereby the lateral slide of the overlying containers may be prevented and the containers may be safely stacked in tiers. Further, each of the adjoining cavities 5 of cover body B to receive the blunt end of the eggs having air cells is communicated by the intervening throat 7 and corresponding external bridge 7a, whereby eggs of large or small sizes may be deposited conformedly in each cavity and at the same time the resistance of eggs against the burden of superposed containers may be enhanced. A further advantage of the egg container consists herein, that is light in weight, easy to handle, suitable for mass production and ensures a low cost, and that is, can be heaped in layers in large numbers to conserve ample space unless used for the purpose of accommodating of eggs. Although description has been made with reference to an embodiment of the present invention, it is to be noted that this invention is not limited to the above embodiment, but may comprise other structures coming within the scope of the invention defined in the appended claims.

What is claimed is:

1. A container for eggs comprising a main body, and a cover body of corresponding dimensions for covering said main body, said main body being hingedly connected to said cover body along corresponding edges thereof, said main body and said cover body being integrally formed together and hingedly connected along an edge, each of said main and cover bodies having walls defining a plurality of egg-receiving partial cavities with corresponding cavities in said cover body being alignable with cavities in said main body when said cover body is positioned over said main body to form a full egg-receiving cavity, said walls of said cover body and said main body sloping from the widest of divergence at the corresponding near ends of said main and cover bodies outwardly in respective opposite directions toward the outer extremity of each body, said cavities of said main body having said walls acutely sloped for receiving the acute end of an egg, said walls of said cover body having said walls gently sloped for receiving the blunt end of an egg, said walls having means defining a plurality of ribs projecting into each respective cavity and a plurality of recesses in each of said cavities for receiving and gently supporting eggs and for permitting expansion of the walls of said cavities to accommodate eggs of various sizes, means on said main and said cover bodies defining complementary interengageable portions between said cavities for supporting said cover body at a spaced location above said main body and for defining an air space therebetween including a projection formed on said cover body and a recess formed on said main body adjacent each of the corners of said egg receiving cavities, said projections being adapted to interengage in respective ones of said recesses.

2. A container for eggs comprising a main body, and a cover body of corresponding dimensions for covering said main body, said main body being hingedly connected to said cover body along corresponding edges thereof, said main body and said cover body being integrally formed together of a plastic material with the plastic therebetween forming a hinge, each of said main and cover bodies having walls defining a plurality of egg-receiving partial cavities with corresponding cavities in said cover body being alignable with cavities in said main body when said cover body is positioned over said main body to form a full egg-receiving cavity, said walls of said cover body and said main body sloping from the widest of divergence at the corresponding near ends of said main and cover bodies outwardly in respective opposite directions toward the outer extremity of each body, said cavities of said main body having said walls acutely sloped for receiving the acute end of an egg, said walls of said cover body having said walls gently sloped for receiving the blunt end of an egg, said walls having means defining a plurality of ribs projecting into each respective cavity and a plurality of recesses in each of said cavities for receiving and gently supporting eggs and for permitting expansion of the walls of said cavities to accommodate eggs of various sizes, means on said main and said cover bodies defining complementary interengageable portions between said cavities for supporting said cover body at a spaced location above said main body and for defining an air space therebetween, a convex projection formed on said cover body and a recess formed on said main body, said projection being adapted to interengage in said recess, said projections being substantially cylindrical and said recesses being complementary cylindrical recesses, except for the recesses adjacent the edges of said main body which are semicylindrical.

3. A container for eggs comprising a main body, and a cover body of corresponding dimensions for covering said main body, said main body being hingedly connected to said cover body along corresponding edges thereof, said main body and said cover body being integrally formed together of a plastic material with the plastic therebetween forming a hinge, each of said main and cover bodies having walls defining a plurality of egg-receiving partial cavities with corresponding cavities in said cover body being alignable with cavities in said main body when said cover body is positioned over said main body to form a full egg-receiving cavity, said walls of said cover body and said main body sloping from the widest of divergence at the corresponding near ends of said main and cover bodies outwardly in respective opposite directions toward the outer extremity of each body, said cavities of said main body having said walls acutely sloped for receiving the acute end of an egg, said walls of said cover body having said walls gently sloped for receiving the blunt end of an egg, said walls having means defining a plurality of ribs projecting into each respective cavity and a plurality of recesses in each of said cavities for receiving and gently supporting eggs and for permitting expansion of the walls of said cavities to accommodate eggs of various sizes, complementary projections and recesses arranged adjacent the four corners of said egg receiving cavities of one of said main and said cover bodies defining complementary interengageable portions between said cavities for supporting said cover body at a spaced location above said main body and for defining an air space therebetween, at least the walls defining cavities of one of said cover body and said main body defining a communication between said cavities.

4. A container for eggs comprising a main body, and a cover body of corresponding dimensions for covering said main body, said main body being hingedly connected to said cover body along corresponding edges thereof, said main body and said cover body being integrally formed together of a plastic material with the plastic therebetween forming a hinge, each of said main and cover bodies having walls defining a plurality of egg-receiving partial cavities with corresponding cavities in said cover body being alignable with cavities in said main body when said cover body is positioned over said main body to form a full egg-receiving cavity, said walls of said cover body and said main body sloping from the widest of divergence at the corresponding near ends of said main and cover bodies outwardly in respective opposite directions toward the outer extremity of each body, said cavities of said main body having said walls acutely sloped for receiving the acute end of an egg, said walls of said cover body having said walls gently sloped for receiving the blunt end of an egg, said walls having means defining a plurality of ribs projecting into each respective cavity and a plurality of recesses in each of said cavities for receiving and gently supporting eggs and for permitting expansion of the walls of said cavities to accommodate eggs of various sizes, means on said main and said cover bodies defining complementary interengageable portions between said cavities for supporting said cover body at a spaced location above said main body and for defining an air space therebetween, said cover body having a projection defined at each of the corners thereof and said main body having a corresponding complementary recess adapted to receive the corresponding projection of said cover body.

References Cited by the Examiner

UNITED STATES PATENTS

| | | | |
|---|---|---|---|
| 2,591,446 | 4/1952 | Lennon | 229—2.5 |
| 2,950,726 | 8/1960 | Kuhl et al. | 229—2.5 X |
| 2,971,685 | 2/1961 | Treida | 229—2.5 |
| 3,104,044 | 9/1963 | Reifers | 229—2.5 |

FOREIGN PATENTS

| | | |
|---|---|---|
| 889,936 | 2/1962 | Great Britain. |

GEORGE O. RALSTON, *Primary Examiner.*

JOSEPH R. LECLAIR, *Examiner.*

D. T. MOORHEAD, *Assistant Examiner.*